(12) United States Patent
Grehant (10) Patent No.: US 6,750,570 B1
(45) Date of Patent: Jun. 15, 2004

(54) FLUX SWITCHING LINEAR MOTOR

(75) Inventor: Bernard Grehant, Nancy-sur-Cluses (FR)

(73) Assignee: Metabode Developpement et Conseil, Nancy-sur-Cluses (FR)

( * ) Notice: Subject to any disclaimer, the term of this patent is extended or adjusted under 35 U.S.C. 154(b) by 0 days.

(21) Appl. No.: 10/030,372

(22) PCT Filed: Apr. 28, 2000

(86) PCT No.: PCT/IB00/00546
§ 371 (c)(1), (2), (4) Date: Oct. 26, 2001

(87) PCT Pub. No.: WO00/67364
PCT Pub. Date: Nov. 9, 2000

(30) Foreign Application Priority Data

Apr. 29, 1999 (FR) .............................. 99 05470

(51) Int. Cl.$^7$ .............................................. H02K 41/03
(52) U.S. Cl. ........................................................ 310/12
(58) Field of Search ............................... 310/12, 13, 14

(56) References Cited

U.S. PATENT DOCUMENTS

| | | | |
|---|---|---|---|
| 4,581,553 A | | 4/1986 | Moczala ..................... 310/12 |
| 4,641,065 A | | 2/1987 | Shibuki et al. ............ 318/135 |
| 4,710,660 A | * | 12/1987 | McKee et al. ............. 310/178 |
| 5,072,144 A | | 12/1991 | Saito et al. .................. 310/12 |
| 5,434,459 A | * | 7/1995 | Pinkerton .................... 310/20 |
| 5,661,350 A | | 8/1997 | Lucidarme et al. .......... 310/12 |

FOREIGN PATENT DOCUMENTS

| | | |
|---|---|---|
| JP | 61139262 | 6/1986 |
| JP | 63133862 | 10/1988 |

OTHER PUBLICATIONS

International Search Report in SN PCT/IB 00/00546.

* cited by examiner

*Primary Examiner*—Dang Le
*Assistant Examiner*—Judson H. Jones
(74) *Attorney, Agent, or Firm*—Bugnion S.A.; John Moetteli

(57) ABSTRACT

A flux-switching linear motor with at least two phases P1, P2, P3 has a moving rig, two permanent magnets 9, 10 and a switching mechanism. The moving rig 1 has at least two field coils 7. Each field coil 7 surrounds a magnetic armature 8 defining moving magnetic poles. The two permanent magnets 9, 10 are magnetized in opposite directions, transverse to the axis of a guidance stator tube 1. The stator tube 1 has magnetic poles 2 disposed along at least one of its walls so as to be successively facing the moving magnetic poles during the travel of the moving rig. The switching mechanism switches the direction of the current in the coils. The permanent magnets 9, 10 are disposed outside the coils and magnetized along an axis parallel to the axis of the coil. The stator magnetic poles include pieces 2 made of magnetic material fixed in a guidance tube made of amagnetic material. The dimension of the magnets as measured along their magnetic axis is chosen so as to create narrow gaps to allow movement of the magnets past the stator poles.

18 Claims, 7 Drawing Sheets

FLUX SWITCHING LINEAR MOTOR

BACKGROUND OF THE INVENTION

The invention relates to a flux-switching linear motor with at least two phases, consisting of a moving rig comprising at least two field coils each surrounding a magnetic armature defining moving magnetic poles and two permanent magnets magnetized in opposite senses, of a guidance stator tube exhibiting magnetic poles disposed along the stator tube, on at least one wall of the stator tube in such a way as to be successively facing the moving magnetic poles during the travel of the moving rig, and of means for switching the sense of the current in the coils.

PRIOR ART

Most of the known linear motors consist of a moving rig comprising several coils travelling past one or two rows of permanent magnets carried by a rail. Such a motor is described for example in patent application EP 0 161 677. In this motor, the magnets are disposed, with alternating poles, along the whole of one of the inside faces of an amagnetic member, made of aluminum for example, the succession of magnets defining a spacing of periodic structure. In its simplest form, the moving rig consists of two coils fitted with wipers for the DC current supply thereof, switched by two tracks disposed on the opposite inside face of the member. The coils are offset by a quarter of a spacing and supplied in phase quadrature. According to another embodiment, the moving rig consists of three coils offset by a third of a spacing and supplied with currents offset by 120°.

Another exemplary embodiment is described in patent application GB 2 233 835. In this embodiment, the moving rig, consisting of three coils, overlaps the fixed magnets disposed in the plane of symmetry of a U-profile member.

These structures therefore require magnets over the entire length of the path of the moving rig, although only some of them are active at a given instant. If high-performance permanent magnets are used, the cost of such an installation is considerable and becomes all the more unacceptable the greater the length of the installation. The use of ferrites would enable this cost to be made tolerable, but at the price of mediocre performance. Moreover, simply reducing the length by sawing the linear rail, in the case of a necessary adaptation on-site, becomes a complex operation which requires the prior dismantling of the magnets and careful cleaning of the entire rail after operation. Another drawback appears when the motor is working in an industrial environment: the metal particles encountered in such an environment are attracted by the magnets and interfere with proper operation of the motor.

The motor described in patent EP 0 667 991 remedies these drawbacks. The guidance tube in which the moving rig travels no longer comprises magnets, but is itself made of a ferromagnetic material and is cut in such a way as to exhibit stator poles disposed in two opposite rows, the poles of one row being offset linearly relative to the poles of the other row. Each phase of the moving rig comprises a field coil surrounding an armature consisting of three pole pieces between which are disposed two permanent magnets of opposite polarities, magnetized along the direction of travel of the moving rig. The stator poles and moving poles are arranged in such a way that in a first of two positions of conjunction of the armature, two first moving poles, each belonging to a respective one of the pole pieces, coincide with two stator poles belonging to two different rows of stator poles, while the other two moving poles are offset with respect to the stator poles, whereas in the second of the two positions of conjunction, the other two moving poles coincide in turn with stator poles, the first two moving poles being in turn offset with respect to the stator poles.

Whereas such a motor has the advantage of comprising no fixed magnets, the tubular form of the stator makes it complex to manufacture as far as the precision required to reduce the size of the gap is concerned. Moreover, the mechanical linking of the moving rig to the driven object requires that the stator tube be split on one of its sides, over its entire length, this impeding its magnetic efficiency. Furthermore, the loads applied to the pole pieces of the armature are asymmetric, thereby engendering one or more torsional couples on the moving rig. This drawback makes it essential to considerably rigidify the structure and/or to increase the gap. It is noted, furthermore, that the magnetic leakages existing between the moving rig and the noncut sides of the stator tube degrade the performance of the motor. Finally, the stator tube opposes the bending operations required in order to produce direct actuators, even in the case of a high radius of curvature.

What is needed is a device that remedies the abovementioned drawbacks. In particular what is needed is a way the magnetic efficiency of the stator, to reduce the magnetic leakages and to make it possible to produce curves by bending the guidance stator tube.

SUMMARY OF THE INVENTION

The linear motor according to the invention is characterized in that the permanent magnets are disposed outside the coils of the moving rig and that they are magnetized along an axis parallel to the axis, of the coil, and in that the stator magnetic poles consist of pieces made of magnetic material fixed in a guidance tube made of amagnetic material, the dimension of the magnets as measured along their magnetic axis being chosen in such a way as to create narrow gaps for the movement of the magnets past the stator poles.

The stator pole pieces are preferably disposed pairwise, on either side of the axis of the guidance tube, and the dimension of the permanent magnets as measured along their magnetic axis corresponds to the distance separating two opposite stator pole pieces. This disposition has the advantage of eliminating the torsional couple on the moving rig.

According to two embodiments of the invention, the magnets of opposite polarity are disposed symmetrically, either (variant 1) with respect to a plane containing the axis of the coil and a perpendicular to the direction of the stator tube, or (variant 2) with respect to a plane containing the axis of the coil and the axis of the stator tube.

The guidance tube can consist of a U-profile member, as in the case of linear motors with fixed magnets, thereby making it possible to link the moving rig mechanically to a driven object without prejudicing performance. The loads on the moving rig are perfectly symmetrical so that there is no torsional couple. Consequently, modest guidance is sufficient to keep the moving rig in the central position in the guidance tube during its motion. Furthermore, nothing prevents the two or three phases from being articulated either via a ball and socket joint, or simply by utilizing the link between the pairs of alternating magnets in direct contact, in the case of variant 1. A modest gap between two phases, created by a central stud, allows a rotation of one of the phases with respect to the other. In this case, two neighboring field coils are linked by two magnets of opposite polarities.

According to a simplified embodiment, the stator pole pieces are disposed on a single wall of the guidance stator tube and the moving rig is equipped with a magnetic short-circuit plate on the opposite side from the stator pole pieces. The effect of this plate is to create an image of the stator poles.

The neighboring coils may share a common magnet. For a three-phase setup, according to variant 1 or according to the simplified embodiment, the two common magnets are then polarized in opposite senses.

In all cases, the switching of the current in the field coils can be achieved through an AC or DC current supply, as described in the prior art, in particular in patent EP 0 667 991. The switching can be achieved by conducting tracks of suitable shape, as described in patent EP 0 161 677 or be achieved by a switching device mounted on the moving rig, as described in patent EP 0 667 991.

The appended drawing represents, by way of example, a few embodiments of the motor according to the invention.

BRIEF DESCRIPTION OF THE DRAWINGS

FIG. 9a represents a simplified embodiment, with a disposition of the stator lugs on a single face of the stator tube.

FIG. 9b illustrates the mirror effect obtained in the embodiment according to FIG. 9a.

DETAILED DESCRIPTION OF THE PREFERRED EMBODIMENTS

Figure 1:
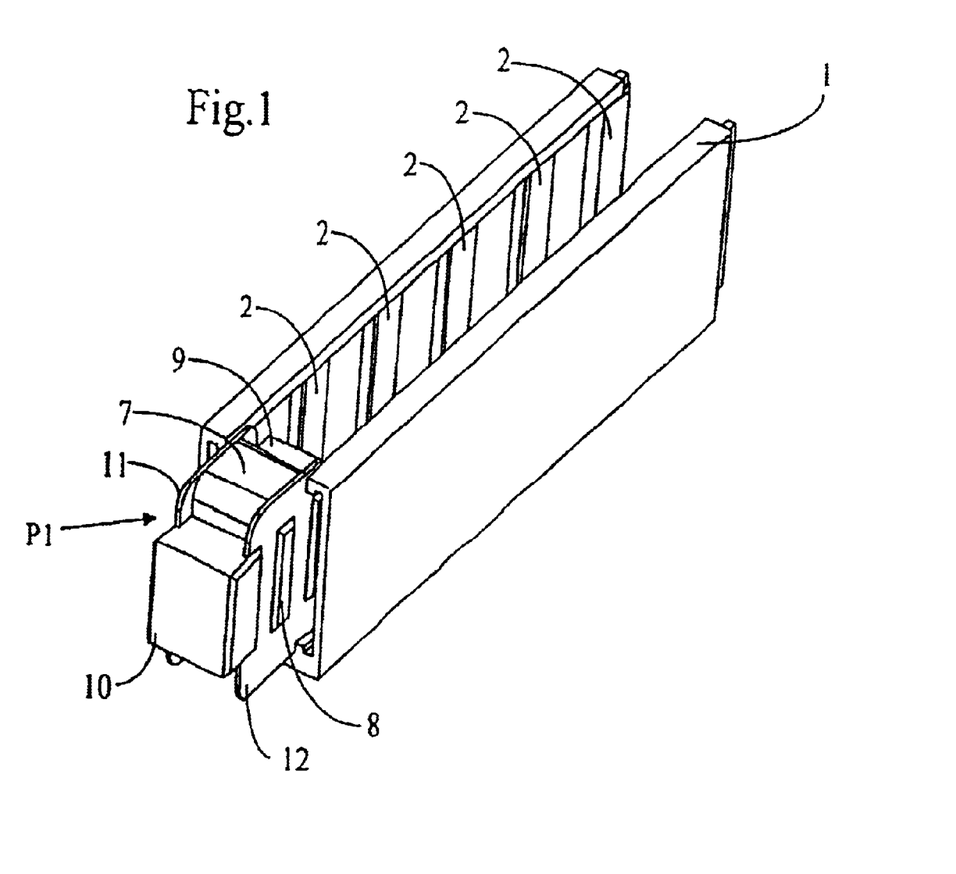
FIG. 1 is a perspective view of a stator tube member in which there travels a moving rig, only a single phase of which has been represented, according to variant 1.
Figure 2:
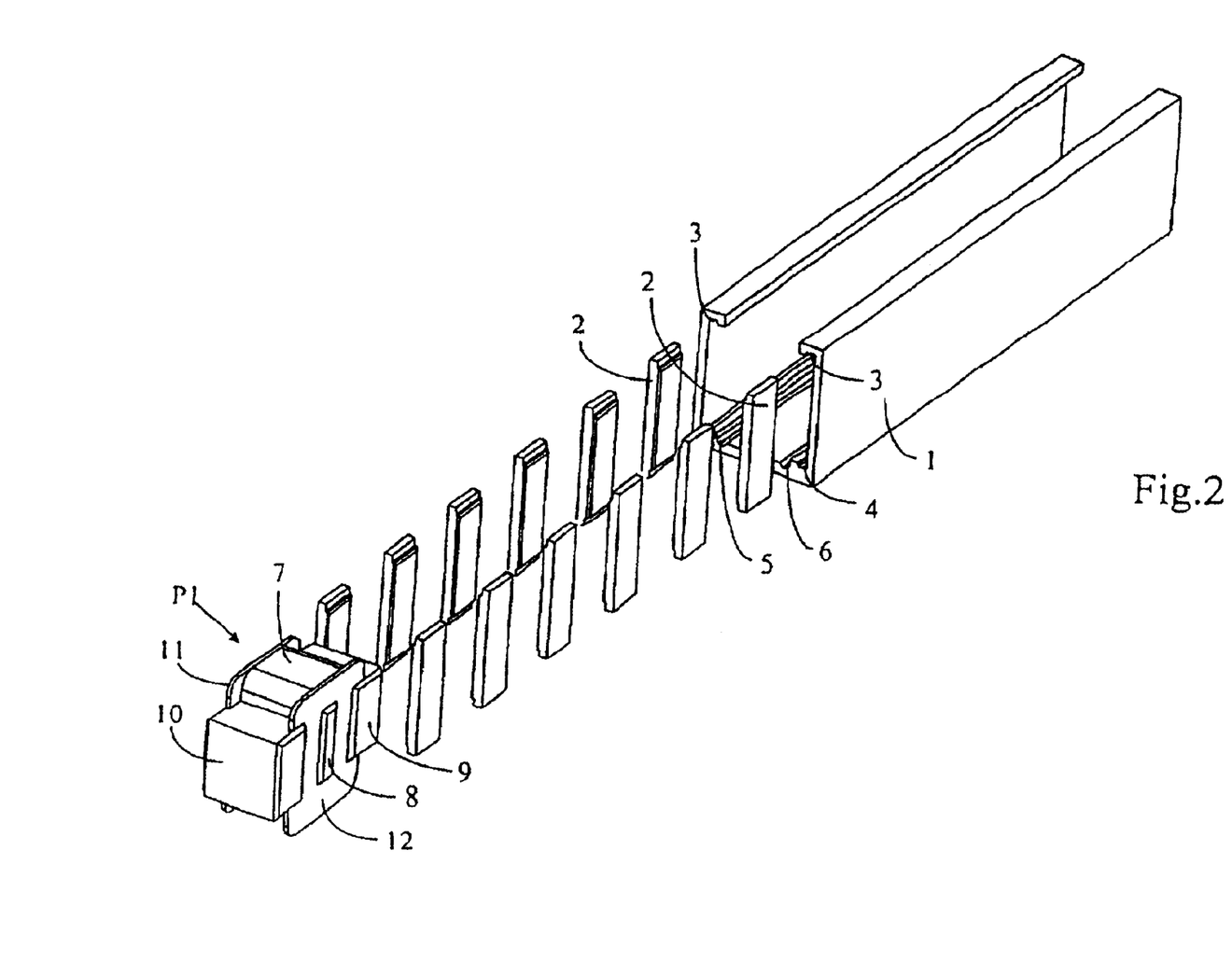
FIG. 2 is an exploded depiction of FIG. 1.
Figure 3:
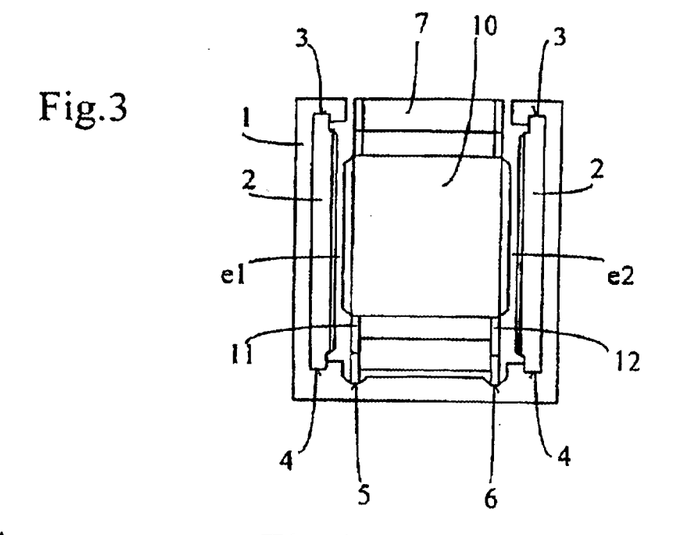
FIG. 3 is an end-on view of FIG. 1, along the axis of the stator tube.

Referring now to FIGS. 1 to 3 the motor represented comprises a stator tube 1 consisting of a U-profile amagnetic guidance member of rectangular section, made for example of aluminum. It could also be made of a synthetic material, since it serves merely as support to the stator poles consisting of pads or of rectangular lugs 2 made of ferromagnetic material, soft steel for example. These pads 2 are held by tight engagement in pairs of opposite grooves 3, 4 formed in the member 1 in such a way as to be fixed against the internal faces of the two parallel opposite legs of the U-profile member. The pads 2 are positioned pairwise, such that the two pads of a pair are situated one facing the other, symmetrically with respect to the axis of the member 1. The successive pairs of pads 2 are equidistant and spaced apart by a distance defining the spacing of the motor. In its transverse wall, the tube 1 furthermore has two additional grooves 5 and 6 for guiding the moving rig, as will be described later. These grooves 5 and 6 may be coated in a material facilitating the sliding of the moving rig.

The moving rig comprises two or three phases, such as the phase P1 represented in FIGS. 1 to 3, each of these phases consisting, in principle, of a coil 7 whose axis is perpendicular to the plane of the stator poles 2, this coil surrounding a core 8 made of magnetic material constituting the armature. Disposed on each side of the coil 7, along the axis of the stator tube 1, are two permanent magnets 9 and 10 magnetized in opposite senses parallel to the axis of the coil. Fixed at the two ends of the coil 7 are two rectangular flanges 11 and 12 made of amagnetic material, preferably of synthetic material, collaborating in the fixing of the permanent magnets 9 and 10. The core 8 and the permanent magnets 9 and 10 exhibit substantially the same square section viewed along the axis of the stator tube 1 and they are aligned along this axis. Viewed from the side, the core 8 and the magnets 9 and 10 exhibit a rectangular section whose width can vary depending on the embodiment. A two-phase moving rig consisting of two phases such as P1 juxtaposed and a three-phase moving rig consisting of three phases such as P1 juxtaposed.

As may be seen in FIG. 3, the moving rig is guided in the tube 1 by its two flanges 11 and 12 sliding in the grooves 5 and 6. The distance between the permanent magnets 9 and 10 or the core 8 and the stator poles 2 defines two gaps e1 and e2.

FIGS. 4A to 4D illustrate the principle of the motor according to the invention, in variant 1 thereof.

Figure 4A:
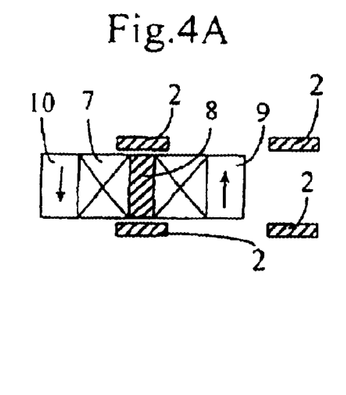
FIGS. 4A to 4D illustrate the principle of switching he flux in a phase.

In the position represented in FIG. 4A, the core 8 is situated between a pair of stator poles 2, the neighboring pairs being situated at distances such that the permanent magnets 9 and 10 are not engaged between these neighboring pairs. The magnetic fields of the two permanent magnets 9 and 10 tend to close up through the neighboring stator poles 2 of the core 8 and through this core 8. These two fields being equal and opposite, the magnetic flux in the core 8 is zero.

Figure 4B:
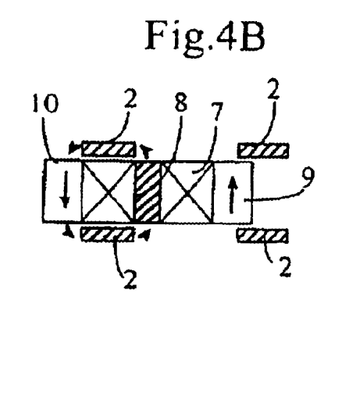

If the moving rig is displaced toward the right so as to be in the position represented in FIG. 4B, it is noted that in this position the main flux in the core 8 originates from the permanent magnet 10 near the stator poles 2. This flux passes through the coil 7 in the first sense indicated by the small curved arrows.

Figure 4C:
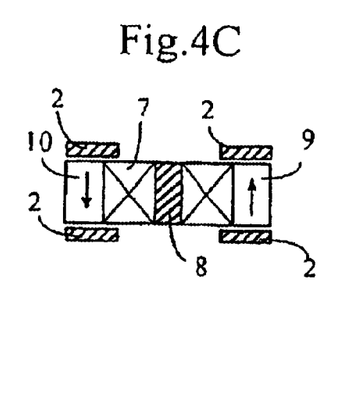

By continuing to displace the moving rig toward the right, the position represented in FIG. 4C is reached, in which the coil 7 is situated exactly midway between two pairs of stator poles 2, the permanent magnet 9 being between the two stator poles of one pair and the magnet 10 between the stator poles of the neighboring pair. In this position, the resultant flux in the coil is again zero.

Figure 4D:
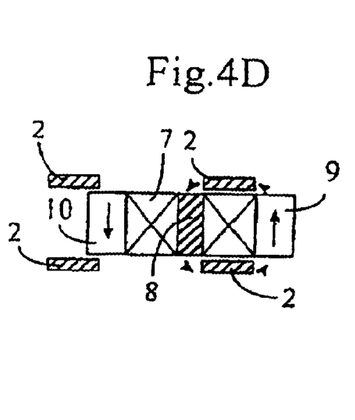

By continuing to displace the moving rig toward the right, the position represented in FIG. 4D is reached, this being the position symmetric with the position represented in FIG. 4B.

In this position, the main flux now originates from the magnet 9 which flows in the direction indicated by the small curved arrows. This flux passes through the coil 7 via the core 8 in a second sense opposite to that of the position represented in FIG. 4B.

The displacement of the coil between the magnetic pieces 2 therefore makes it possible to obtain an alternating electromotive force.

The field of the magnet 9 in FIG. 4B and that of the magnet 10 in FIG. 4D produces an unwanted flux in the core 8 which constitutes a magnetic loss. The distance between the poles of the magnet 9 in FIG. 4B and the ends of the core 8 on the one hand and the stator pole pieces 2 through which the main flux passes is however relatively large, so that the loss is very small, unlike what occurs in the structure according to patent EP 0 667 991. By using lugs beveled on the opposing edges it is possible for magnetic losses to be further limited.

The juxtaposition of two or three moving rigs, as is represented in FIGS. 1 to 3, and schematically, in FIGS. 4A to 4D, makes it possible to produce a two-phase or three-phase motor, respectively.

Figure 5:
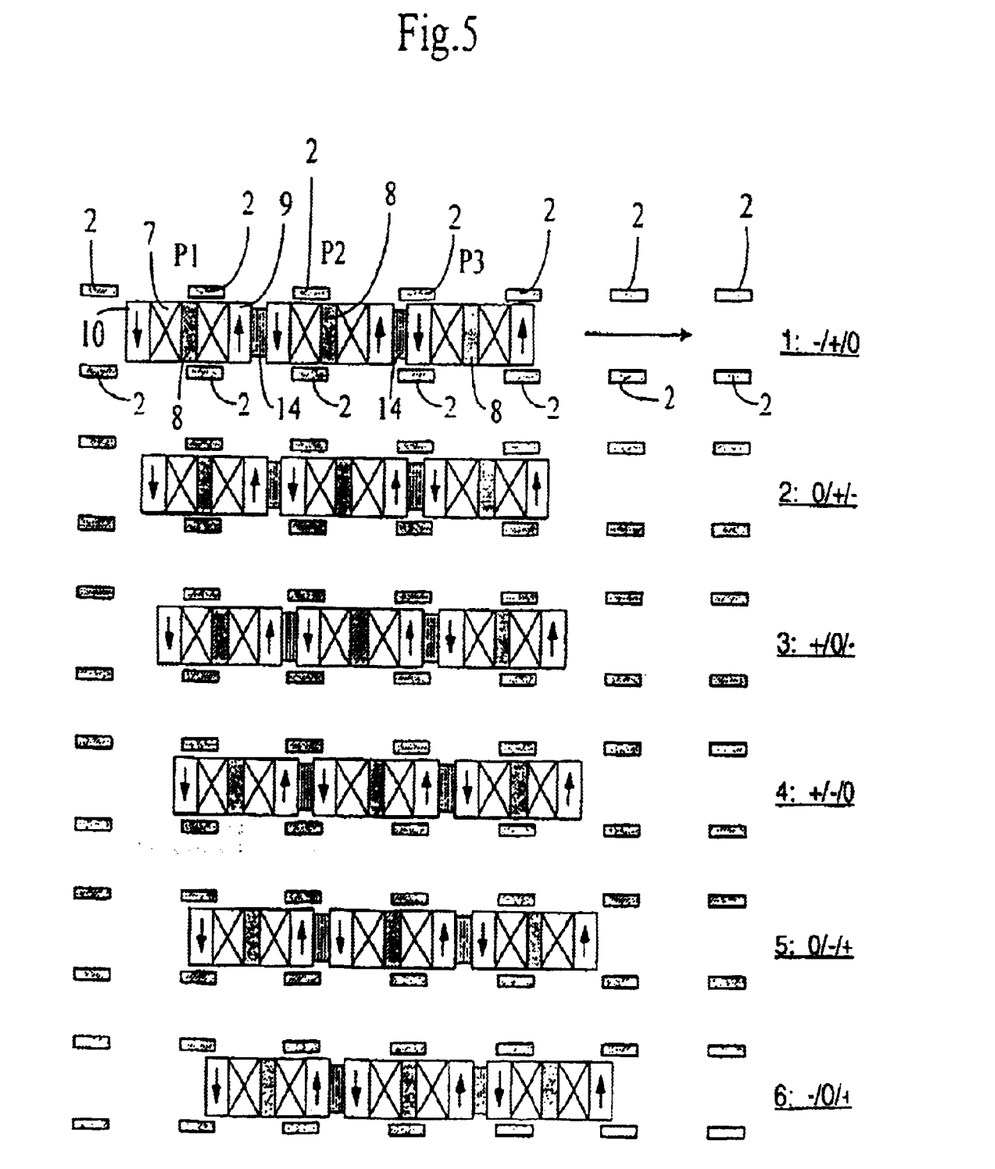
FIG. 5 schematically represents, for a three-phase motor in which each phase is fitted with two distinct permanent magnets, a dynamic sequence of successive positions offset by ⅙ of a spacing and the corresponding distribution of the flux in the three phases.

A three-phase motor is represented schematically in FIG. 5. It consists of three phases P1, P2 and P3 the axes of whose coils are respectively offset by $\frac{1}{3}$ of a spacing and $\frac{2}{3}$ of a spacing relative to the stator spacing defined by the distance between two successive pairs of stator poles. The distance between the axes of two neighboring coils is therefore equal to $\frac{4}{3}$ of a spacing. In the case of a two-phase motor, the axes of the coils would be offset respectively by $\frac{1}{4}$ of a spacing relative to the stator spacing. Obviously, these offsets are given to within an integer number of spacings, and it is possible to add a half-spacing thereto or subtract a half-spacing therefrom, simply by reversing the current in the relevant coil.

FIG. 5 represents a dynamic sequence of the six positions offset by $\frac{1}{6}$ of a spacing and the corresponding distribution of the flux in the three phases. The signs +, −, o appearing on the right of each sequence indicate the presence of a flux in the core of each phase and its sense, in the absence of current. Thus, for example, −/+/o signifies that in phase P1 there is a "negative" flux directed downward, for P2 a "positive" flux directed upward and for P3 a zero flux, and so on.

As is done in any DC machine, the current in a coil is reversed at the moment at which the induced electromotive force vanishes and changes sense, that is to say at the moment at which the flux in this coil is a maximum, in one sense or the other. As in patent EP 0 667 991, each phase can be equipped with a pair of wiper contacts travelling over supply tracks made of copper printed on an insulating support mounted in the bottom of the stator tube 1, that is to say between the grooves 5 and 6. These tracks are supplied with DC current and switching can be achieved through the shape, in the form of nested recesses, of the two tracks, as represented and described in patent EP 0 161 677. It is also possible to supply the coils via two continuous straight conductor rails and to achieve switching by means of a switching device mounted in each of the phases of the moving rig, as described in patent EP 0 667 991 and as is known to the person skilled in the art. Special-purpose electronic circuits readily allow such control; based on the state of Hall-effect sensors mounted directly on the moving rig, for example the MC33033 integrated circuit from Motorola.

The structure of the stator tube alone makes it possible to produce curves by bending the tube 1. In the moving rig, the three phases of the motor represented in FIG. 5 can be articulated together in such a way as to facilitate the uptake of curve. This articulation 14 can be effected via a ball and socket joint or quite simply by utilizing the magnetic link between the alternating pairs of magnets in direct contact, by leaving a modest gap between two neighboring phases, which gap is caused by a central stud allowing rotation of one phase with respect to the other.

Figure 6:
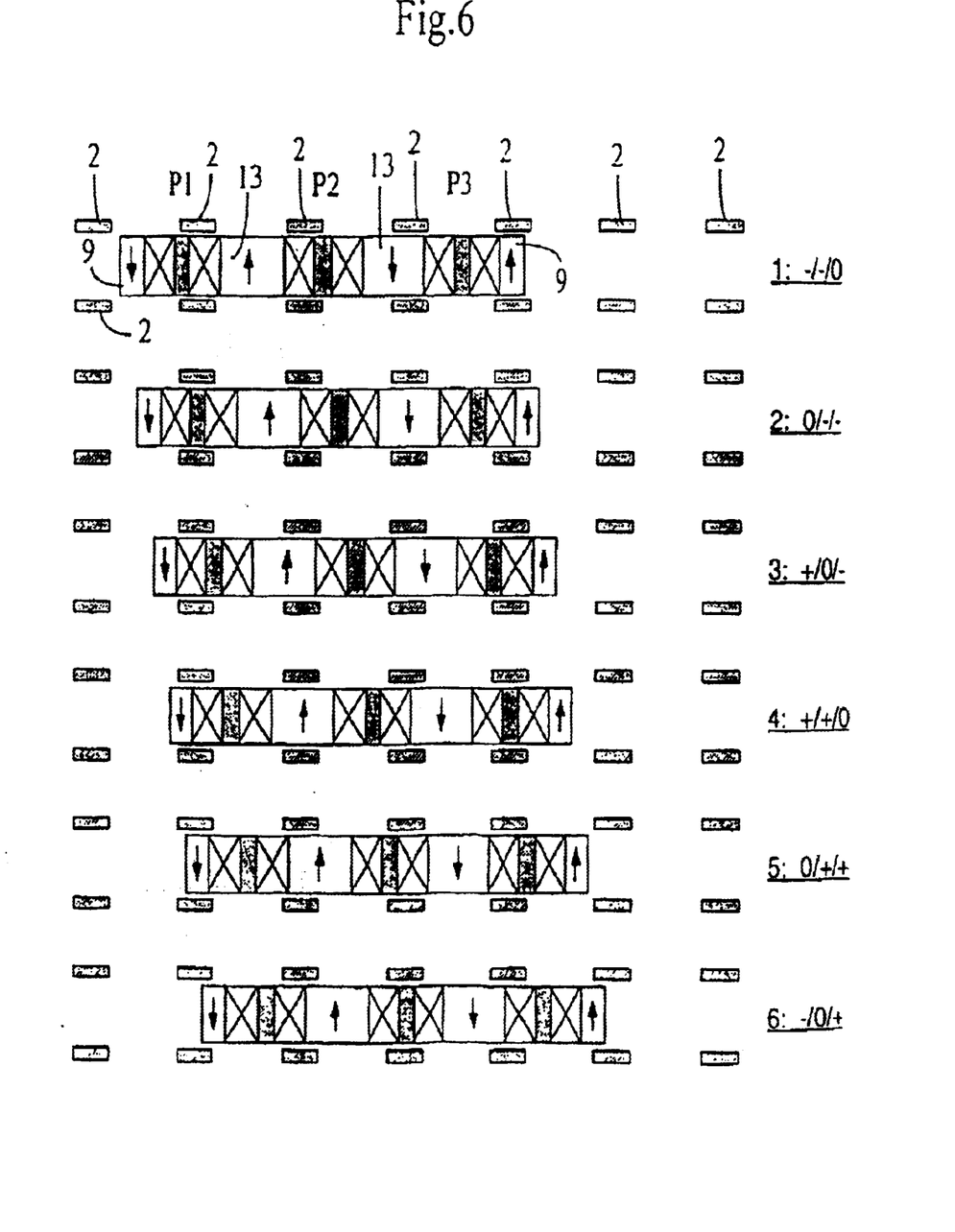
FIG. 6 is a similar representative view for a three-phase motor in which the phases have a permanent magnet in common.

If the moving rig does not need to be articulated, it can be simplified as represented in FIG. 6 which represents a sequence in a similar manner to FIG. 5. In this embodiment the magnets 9 and 10 linking two phases together are replaced by a common magnet 13 whose sense of magnetization is respectively opposite to the sense of magnetization of the nearest exterior magnet, the polarities of the magnets 13 consequently being mutually opposite, as is apparent in FIG. 6. To recover operation similar to that of the embodiment represented in FIG. 5, the connections of the coil of phase P2 should be reversed, as emerges from the flux distribution indicated for each of the positions of the sequence. It is clear that this disposition with common magnet prevents a considerable leakage flux between directly neighboring reverse-polarized magnets.

In the embodiment represented in FIGS. 1 to 3 the moving rig could obviously be fitted with rollers running in the grooves 5 and 6.

The practical embodiment of a linear motor according to the invention is accompanied by alterations suitable for optimizing its performance. FIG. 7 and FIGS. 8a to e show a device with two-phase moving rig, now viewed from the front, in a plane parallel to that of the lugs.

Figure 7:
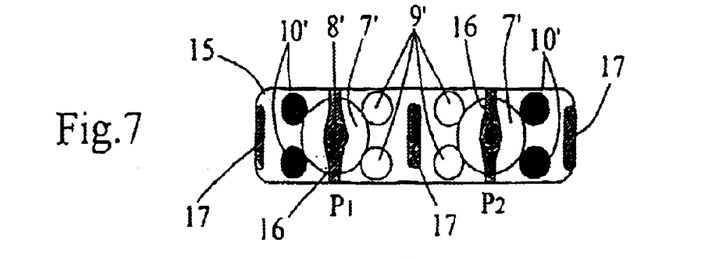
FIG. 7 is a front view, in a plane parallel to that of the stator lugs, of a moving rig according to a second embodiment.

For the sake of convenience and use of standard components, the magnets 9' are here cylindrical, each of the previous rectangular magnets being replaced by a pair of magnets, crimped into a casing 15. By convention, a dark face will be said to correspond to a North pole.

The coils 7' are also cylindrical, as are their cores 8', but a pole shoe 16, elongate in a direction perpendicular to the motion, is advantageously disposed on either side of each coil/core -assembly. This shoe ensures the dual function of collecting the flux transmitted by the lugs 2, and of mechanically holding the coil in the casing 15.

Finally, it is very advantageous to dispose, parallel to the axis of the magnets and of the cores and with the same length, soft steel magnetic pads 17, intended to ensure the correct flow of the flux of the magnets which are not in a position of linkage with a coil core at a given instant. Like magnets and coils, these pads 17 pass right through the casing 15.

Figure 8A:
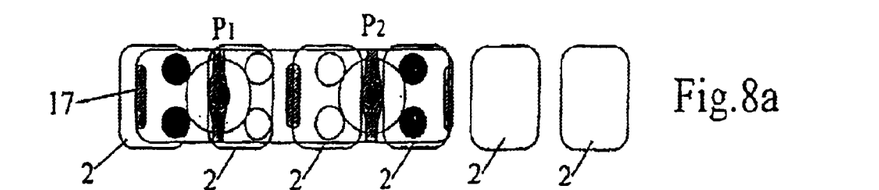
FIGS. 8a to 8e represent the moving rig of FIG. 7 and the stator lugs, in five successive positions of the moving rig.

FIG. 8a represents the moving rig facing a row of stator lugs 2, in an initial position. For greater ease of viewing, the lugs 2 here have an exaggerated height: it is amply sufficient that they overlap the magnets, and any superfluous height is manifested as an increase in the magnetic leakages from lug to lug.

Because of the respective positions of the moving rig and of the lugs, it is noted that the coil of phase P1 is, ideally, completely traversed by the flux of the South magnets situated to its right, while the North magnets situated to its left have their flux closed up by the left end pad 17. At the same instant, the flux in phase P2 is zero.

Figure 8B:
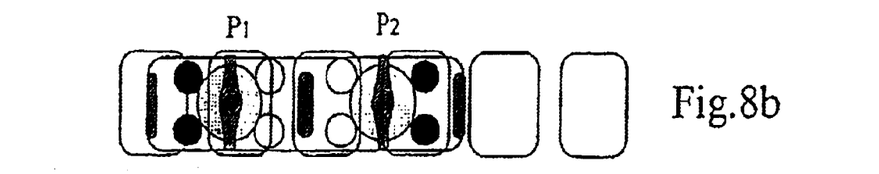

An instant later, in FIG. 8b, the flux in P1 has decreased, while the flux in P2 increases, arising from the North magnets situated to its right.

Figure 8C:
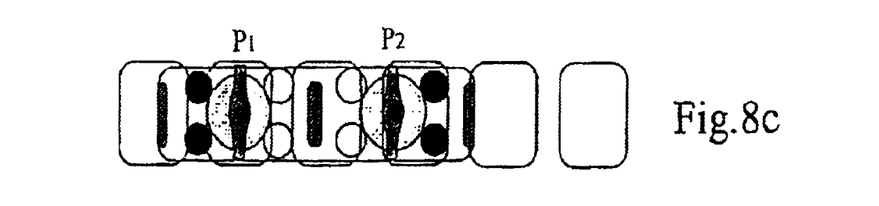
Figure 8D:
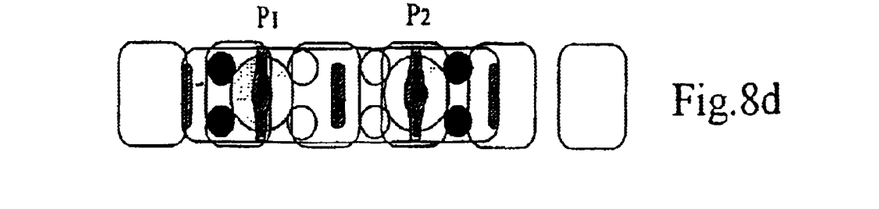
Figure 8E:
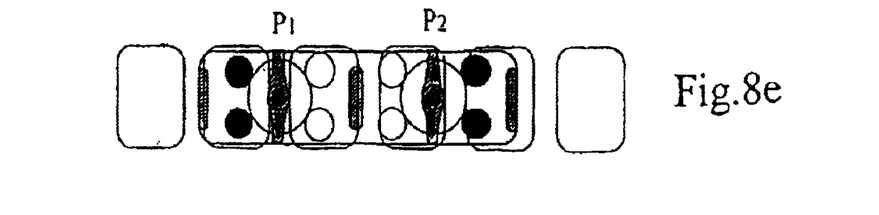

The instant of FIG. 8c is magnetically offset by a quarter of a spacing with respect to 8a: the flux is now zero in P1, while it is a maximum in P2. And so on and so forth: immediately afterwards, the flux in P1 originates chiefly from the North magnets situated to its left.

It is noted that this disposition of the elements makes it possible both to overlap magnets and cores during a conjunction, and to prevent a situation of quasi-zero flux from lasting too long.

Figures 9A, 9B:
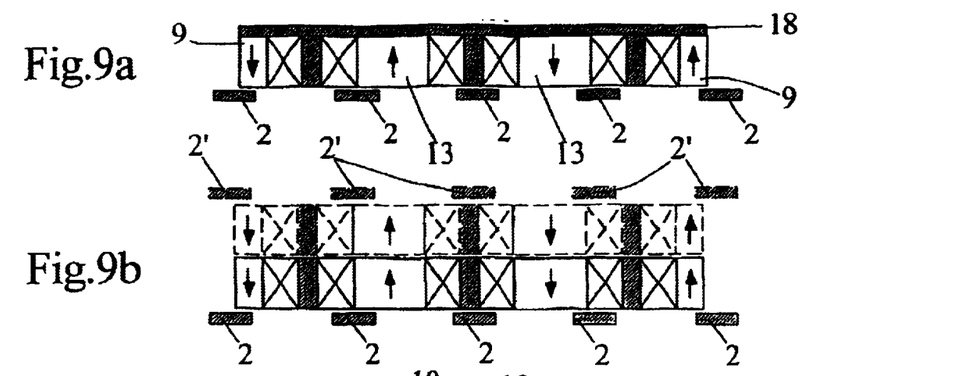

Finally, all the embodiments described in the patent suit a simplified version, represented in FIG. 9a, with a single row of stator lugs 2, and a magnetic short-circuit or flux closure plate 18, secured to the moving rig, on the side where the stator lugs are omitted. This disposition has the advantage of greater simplicity of production, especially when bending. On the other hand, there is no longer as previously, balancing of loads, hence the need for more careful guidance, especially with the aid of casters. From the magnetic standpoint, such a magnetic short-circuit 18 is known to play the role of mirror. Everything occurs as if there were still a double row of stator lugs 2, but with a distance at least twice the width of the moving rig as is illustrated in FIG. 9b, where the image lugs 2' are represented dashed.

Figure 10:
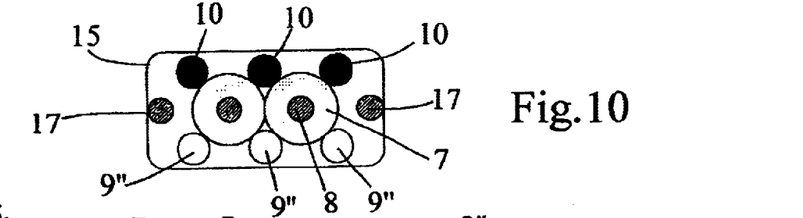
FIG. 10 represents a two-phase embodiment, according to variant 2, viewed from the front in a plane parallel to that of the lugs.

FIG. 10 now represents a moving rig according to the second variant of the invention. The magnets of like polarity are now disposed on the same side of the plane defined by the axis of the coils and the axis of the stator tube. On taking as orientations those defined by the sheet, the magnetic flux which on average previously flowed horizontally, originating from the magnets situated either on the left or on the right of the coil, will now be said to flow on average vertically, originating from the magnets situated either above or below the coil. As previously, it is the disposition of the stator lugs which favors one or other sense of flow of the resultant flux in the core.

Figure 11A:
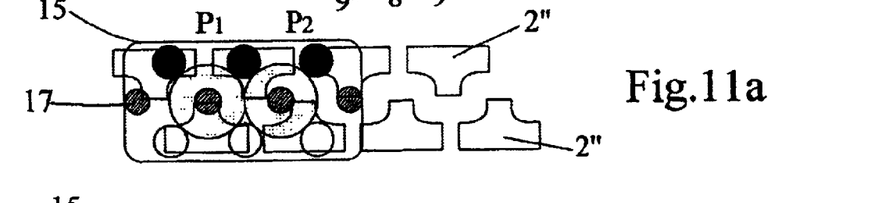
FIGS. 11a to 11c represent the moving rig of FIG. 10 and the stator lugs, in three successive positions of the moving rig.
Figure 11B:
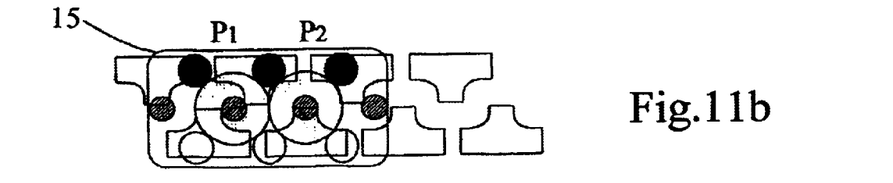
Figure 11C:
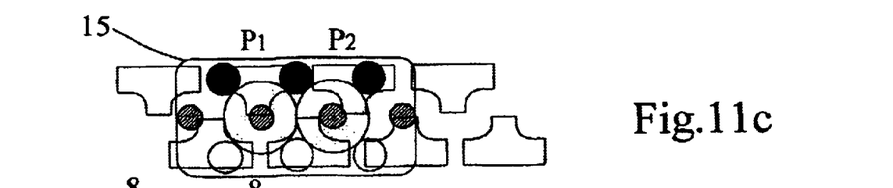

The principle of variant 2 is sufficiently close to that of variant 1 as to be capable of direct illustration in a two-phase embodiment, here one which is particularly compact in the-direction of motion. In FIG. 10, the two coils 9" are separated by three quarters of a stator spacing. No pole shoe is used on the cores 8 of the coils. Two lateral flux closure elements 17 are used, here in cylindrical form. FIGS. 11a to 11c illustrate the manner of operation of this variant 2 in the presence of stator lugs 2". The latter have a T shape which minimizes the lug-to-lug leakages, as would likewise a triangular shape, and are again disposed pairwise, symmetrically on either side of the plane parallel to the lugs and containing the axis of the stator tube. There are now two pairs of stator lugs 2" per spacing: the lugs are oriented alternately upward and downward every half-spacing.

Because of the respective positions of the moving rig 15 and of the stator lugs 2", it is noticed in FIG. 11a that the coil of phase P1 is, ideally, completely traversed by the flux of the South magnets situated below, while the North magnet situated above and to the left has its flux closed up partially by the left end auxiliary cylinder 17. At the same instant, the flux in phase P2 is zero, both on account of symmetry and because the core of the coil of P2 tends to become short-circuited by the magnets which lie to the top left and bottom right of P2.

A quarter of a spacing later, in FIG. 11b, the flux in P1 has become zero, while the flux in P2 is a maximum, arising from the South magnets situated below.

The instant of FIG. 11c is offset by half a spacing with respect to 11a: the flux is now zero in P2, whereas it is a maximum in P1, now originating from the North magnets situated above. And so on and so forth.

It will be observed that variant 2 allows the sharing of common magnets between consecutive phases. In the limit, the top and bottom magnets could be two individual rectangular magnets placed above and below (in the drawing) the coils, that is to say on each side of the coils when referring to the direction of travel of the moving rig.

Likewise, in principle this variant permits a link up of all the upper stator lugs and of all the lower (in the drawing) stator lugs: there would then be, on each of the stator faces used, two pieces in the form of nested combs. This linking of the lugs would not however be used, owing to the appreciable increase in magnetic leakages which it brings about.

Finally, it is possible to apply the alterations relating to variant 1 to variant 2, especially the use of a magnetic short-circuit on one face of the moving rig so as to use just one face of the stator member.

Figure 12:
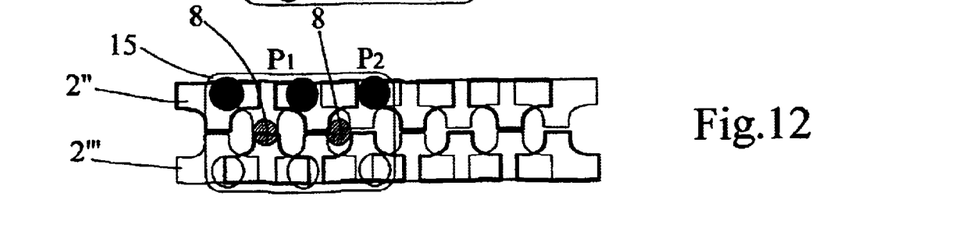
FIG. 12 represents a variant of the disposition of the stator lugs used in FIG. 11.

Finally, FIG. 12 illustrates one of the countless embodiments inspired by the invention. This is a variant of the previous case, but this time the stator lugs 2" and 2'" of one and the same pair are symmetric with respect to the axis of the stator tube. The lugs 2" belonging to the same face of the stator tube have been represented with thick lines and the lugs 2'" belonging to the opposite phase have been represented with thin lines. To make viewing easier, the coils are represented only by their core 8. Phase P1 is in a position of maximum flux. It is observed that the flux of one pair of magnets passes through the core and then the pair of magnets of opposite polarity, this time in series with the previous pair, before closing up here in the air, which will give it a small value. A three-phase embodiment allows the flux to close up through the core of the other two coils. However, the lengthening of the flux lines according to such a magnetic circuit is detrimental to the flux value obtained.

Variant 1 also allows the magnets of alternate polarity to be placed in series by using for example diagonally arranged lugs, of opposite direction on the two faces of the stator tube. However, here again the fluxes obtained are too small to justify the use of this disposition.

It is clear that any degraded version of the embodiments presented here is covered by the invention, such as for example the use of a single stator face without there being any magnetic short-circuit on the moving rig, or else the use of soft steel elements in partial substitution for the magnets, or else the making of an equivalent of the two top and bottom magnets of variant 2 through a single magnet, perpendicular to the axis of the coils and to the axis of the stator tube, associated with pole pieces, or a geometry and disposition of the lugs bringing about the placement in series of the magnets of alternate polarity and hence a lengthening of the paths of the fluxes.

Although illustrative embodiments of the invention have been shown and described, a wide range of modification, change and substitution is contemplated in the foregoing disclosure and in some instances, some features of the present invention may be employed without a corresponding use of the other features. Accordingly, it is appropriate that the appended claims be construed broadly and in a manner consistent with the scope of the invention.

What is claimed is:

1. A flux-switching linear motor with at least two phases comprising:
   a. at least two field coils each surrounding a magnetic armature defining moving magnetic poles, and
   b. two permanent magnets magnetized in opposite directions, transverse to the axis of a guidance stator tube, the stator tube having magnetic poles disposed along at least one wall of the stator tube so as to be successively facing the moving magnetic poles during the travel of a moving rig, and c. means for switching direction of the current in the coils, wherein the permanent magnets are disposed outside the coils and magnetized along an axis parallel to the axis of the coil, and the stator magnetic poles comprise pieces made of magnetic material fixed in a guidance tube made of a magnetic material, the dimension of the magnets as measured along their magnetic axis being chosen so as to create narrow gaps to allow movement of the magnets past the stator poles.

2. The motor as claimed in claim 1, wherein the guidance stator tube comprises a rectangular U-profile member on two opposite internal walls of which are fixed lugs or pads made of magnetic material which constitute the stator poles.

3. The motor as claimed in claim 1, wherein an active part comprises a magnetic short-circuit plate made of a soft ferromagnetic material disposed on the face of the active part parallel and opposite to the stator poles in such a way as to create an image of the stator poles.

4. The motor of claim 3, wherein fixed tiles, lugs or pads made of magnetic material which constitute the stator poles are disposed on one unique wall of the guidance stator tube.

5. A flux switching linear motor comprising:
   an active part with at least two phases, each phase comprising at least: a magnetic core,
   an electric winding wound around at least one part of the magnetic core, and
   two magnets; and
   a passive part including:
      a non magnetic rail defined along an axis, and
      a plurality of independent ferromagnetic tiles, regularly spaced on said rail, in which the induced magnetic flux in the winding is mainly supplied by the first magnet in a first relative position of the active and of the passive parts, and is mainly supplied by the second magnet in a second relative position of the active and of the passive parts.

6. The motor of claim 5, wherein the two magnets are polarized in opposite directions parallel to the magnetic core.

7. The motor of claim 5, wherein the two magnets are polarised in opposite directions perpendicular to a surface of the non magnetic rail.

8. The motor as claimed in one of claims 5, 6 or 7, wherein magnets of opposite polarity which relate to a phase are disposed symmetrically in front of and behind the coil in the direction of motion.

9. The motor as claimed in one of claims 5, 6 or 7, wherein the magnets of opposite polarity which relate to a phase are disposed symmetrically with respect to the plane containing the axis of the rail.

10. The motor as claimed in one of claims 5–7, wherein the rail comprises a rectangular U-profile member on two opposite internal walls of which are fixed lugs or pads made of magnetic material which constitute the stator poles.

11. The motor as claimed in one of claims 5–7, wherein the active part comprises a magnetic short-circuit plate made of a soft ferromagnetic material disposed on the face of the active part parallel and opposite to the stator poles in such a way as to create an image of the stator poles.

12. The motor as claimed in one of claims 5–7, wherein the active part comprises a magnetic short-circuit plate made of a soft ferromagnetic material disposed on the face of the active part parallel and opposite to the stator poles in such a way as to create an image of the stator poles, wherein fixed tiles, lugs or pads made of magnetic material which constitute the stator poles are disposed on one unique wall of the guidance stator tube.

13. The motor as claimed in one of claims 2, 3, 5–7, and 12, wherein the active part is supplied with DC current and that the means for switching the current are mounted on the active part.

14. The motor as claimed in one of claims 2, 3–7, and 12, wherein the active part contains, parallel to the axis of the coils, feedthroughs made of soft ferromagnetic material.

15. The two-phase motor with two coils as claimed in claim 5 wherein the axes of the coils are offset by a quarter or three quarters of a spacing relative to the stator spacing defied by the distance between the positions of two consecutive stator pole pieces.

16. The three-phase motor with three coils as claimed in one of claims 2, 3–7, and 12, wherein the phases are offset by a third or two thirds of a spacing relative to the stator spacing defined by the distance between the positions of two consecutive stator pole pieces.

17. The motor as claimed in one of claims 2, 3–7, and 12, wherein subassemblies which constitute each of the phases are articulated together.

18. The motor as claimed in one of claims 2, 3–7, and 12, wherein two consecutive phases share a common magnet.

* * * * *

UNITED STATES PATENT AND TRADEMARK OFFICE
CERTIFICATE OF CORRECTION

PATENT NO. : 6,750,570 B1
DATED : June 15, 2004
INVENTOR(S) : Grehant

It is certified that error appears in the above-identified patent and that said Letters Patent is hereby corrected as shown below:

Title page,
Item [73], Assignee, replace "Metabode Developpement et Conseil" by -- Metabole Developpement et Conseil --

Signed and Sealed this

Twenty-third Day of November, 2004

JON W. DUDAS
*Director of the United States Patent and Trademark Office*